US012412453B2

(12) United States Patent
Fong et al.

(10) Patent No.: US 12,412,453 B2
(45) Date of Patent: Sep. 9, 2025

(54) SYSTEM AND METHOD FOR CASINO JACKPOT PROCESSING AND MARKER PAYMENT

(71) Applicant: Everi Payments Inc., Austin, TX (US)

(72) Inventors: Adam Fong, Las Vegas, NV (US); Justin Nelson, Las Vegas, NV (US); Ryan May, Las Vegas, NV (US); Steve Nguyen, Santa Ana, CA (US)

(73) Assignee: Everi Payments Inc., Las Vegas, NV (US)

( * ) Notice: Subject to any disclaimer, the term of this patent is extended or adjusted under 35 U.S.C. 154(b) by 303 days.

(21) Appl. No.: 17/962,274

(22) Filed: Oct. 7, 2022

(65) Prior Publication Data

US 2023/0079094 A1 Mar. 16, 2023

Related U.S. Application Data

(63) Continuation-in-part of application No. 17/723,682, filed on Apr. 19, 2022, now Pat. No. 11,893,859.

(60) Provisional application No. 63/178,109, filed on Apr. 22, 2021.

(51) Int. Cl.
*G07F 17/32* (2006.01)

(52) U.S. Cl.
CPC ...... *G07F 17/3258* (2013.01); *G07F 17/3239* (2013.01)

(58) Field of Classification Search
CPC ......................... G07F 17/3258; G07F 17/3239
See application file for complete search history.

(56) References Cited

U.S. PATENT DOCUMENTS

| | | | | |
|---|---|---|---|---|
| 5,505,461 | A | 4/1996 | Bell | |
| 6,709,333 | B1 | 3/2004 | Bradford et al. | |
| 6,935,951 | B2 | 8/2005 | Paulsen | |
| 8,221,224 | B2 | 7/2012 | Nguyen et al. | |
| 8,246,450 | B2 | 8/2012 | Nguyen et al. | |
| 8,517,823 | B2 | 8/2013 | Nguyen et al. | |
| 8,727,892 | B1 | 5/2014 | Chun | |
| 8,753,194 | B2 | 6/2014 | Schneider | |
| 9,715,787 | B1 * | 7/2017 | Sanford | G06Q 20/207 |
| 10,297,105 | B2 | 5/2019 | LeMay et al. | |
| 10,319,184 | B2 | 6/2019 | Flaherty | |
| 11,030,854 | B2 | 6/2021 | Alderucci et al. | |
| 2002/0077169 | A1 * | 6/2002 | Kelly | G07F 17/3262 463/16 |
| 2002/0103027 | A1 * | 8/2002 | Rowe | G07F 17/3239 463/39 |
| 2003/0083126 | A1 | 5/2003 | Paulsen | |

(Continued)

OTHER PUBLICATIONS

Wikipedia; Personal digital assistant, p. 2/10. Published Jul. 23, 2018 <https://en.wikipedia.org/w/index.php?title=Personaldigitalassistant&oldid=851540806> Accessed Sep. 8, 2020. (Year: 2018).

*Primary Examiner* — Kevin Y Kim
(74) *Attorney, Agent, or Firm* — Snell & Wilmer LLP

(57) ABSTRACT

In accordance with a method and system for processing a casino jackpot won by a player, information regarding the player is utilized to interrogate one or more casino systems for the existence of any outstanding casino credit, such as outstanding markers, to the player. In the event of outstanding casino credit, all or a portion of the amount of the jackpot may be credited to pay the casino credit balance.

20 Claims, 1 Drawing Sheet

(56) References Cited

U.S. PATENT DOCUMENTS

| | | | |
|---|---|---|---|
| 2005/0181864 | A1 | 8/2005 | Britt et al. |
| 2007/0099696 | A1 | 5/2007 | Nguyen et al. |
| 2008/0207296 | A1 | 8/2008 | Utnick et al. |
| 2009/0292641 | A1 | 11/2009 | Weiss |
| 2012/0046097 | A1 | 2/2012 | Nguyen et al. |
| 2012/0122555 | A1 | 5/2012 | Schneider et al. |
| 2013/0275169 | A1 | 10/2013 | Acres |
| 2014/0244456 | A1 | 8/2014 | Huang et al. |
| 2017/0053489 | A1 | 2/2017 | Colvin et al. |
| 2018/0082516 | A1 | 3/2018 | Kubajak et al. |
| 2020/0105097 | A1 | 4/2020 | Fong et al. |
| 2021/0321569 | A1 | 10/2021 | Fong et al. |
| 2022/0343728 | A1 | 10/2022 | Fong et al. |

* cited by examiner

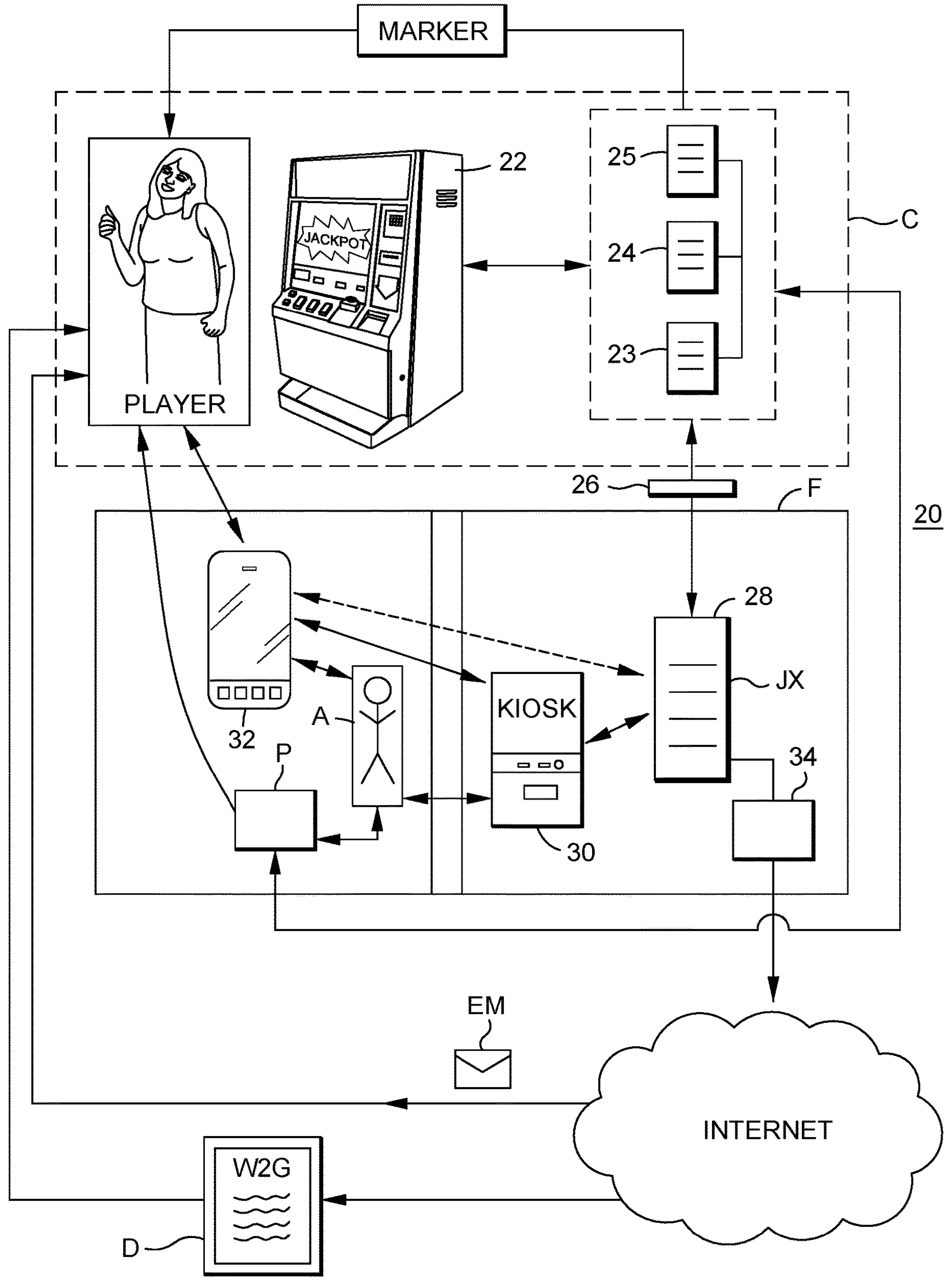
MARKER
22
JACKPOT
25
24
23
C
PLAYER
26
F
20
28
JX
KIOSK
A
32
P
34
30
EM
INTERNET
W2G
D

SYSTEM AND METHOD FOR CASINO JACKPOT PROCESSING AND MARKER PAYMENT

RELATED APPLICATION DATA

This application is a continuation-in-part of U.S. application Ser. No. 17/723,682, filed Apr. 19, 2022, which claims priority to U.S. Provisional Application Ser. No. 63/178,109, filed Apr. 22, 2021. Each of these prior applications is incorporated herein by reference in its entirety.

FIELD OF THE INVENTION

The present invention relates to casino gaming, including casino game awards such as jackpots.

BACKGROUND OF THE INVENTION

Casino winnings may be paid in different manners. For example, relative to a gaming machine which is capable of dispensing monetary winnings or a monetary value ticket or the like, the winnings may be directly awarded and then dispensed to the player. As one example, a player might win $500. Those winnings might be associated with a monetary value credit meter at the gaming machine. The player might then elect to cash-out that balance, including the winnings, as either coins dispensed at the machine or, in most modern gaming machines, a monetary value ticket which can be redeemed.

A casino may desire, however, to validate larger jackpots. In that event, the gaming machine may report a jackpot win to the casino gaming system. However, the jackpot winnings may not be awarded until casino personnel validate the win.

In addition, some jurisdictions like the U.S. require that a casino report player winnings over certain thresholds. For example, relative to a gaming machine, this threshold is currently $1200 in the U.S. In a situation where a player wins more than $1200.00, the casino will generally require the player to complete a jackpot winnings form which the casino can then use to report the jackpot win to the Internal Revenue Service of the U.S. government. This form, called a W2G in the U.S., includes information regarding the amount of the win and the player's identity (such as their name and social security number and the like).

One problem for casinos is that the player must later submit a copy of the tax reporting form with their tax return. Thus, a casino must generally provide a copy of the tax reporting form to the player, such as in the form of a receipt. However, players often lose their copy of the form. At tax filing time (usually April 15 of each year in the U.S.), players often bombard casinos with requests for copies of their tax reporting forms.

Other problems currently exist with the processing and payment of jackpots. For example, in the situations where the casino desires to directly pay a jackpot to a player (as opposed to forcing the player to travel to a casino cage to obtain their winnings), the casino must supply customer service personnel with sufficient funds to pay the player. Given the number of jackpots that a casino may need to pay in a day, this creates complexities with keeping the customer service personnel sufficiently funded, but at the same time ensuring that the funds are trackable and remain secure.

Yet another problem relates to casino credit. Frequently, casinos extend credit to players, such as via casino markers. These markers allow players to access funds for gaming purposes. In some cases, however, players may receive substantial game winnings and yet not pay of their casino debt.

Solutions to these and other problems are desired.

SUMMARY OF THE INVENTION

Embodiments of the invention include, but are not limited to, methods and systems for processing a jackpot won by a player, including determining whether the player has an outstanding credit balance, such as an outstanding marker balance or other credit obligation, and optionally crediting all or a portion of the jackpot to payment to such a balance.

One embodiment of the invention comprises a jackpot processing system comprising a jackpot a mobile attendant device, the attendant device comprising a processor configured to execute machine readable code, a memory, a display device, at least one user input device and machine-readable code stored in the memory; a jackpot processing server comprising a processor configured to execute machine readable code, a memory, a communication interface, and machine readable code stored in the memory the executable by the processor; the machine readable code of the jackpot processing server configured to cause the processor thereof to transmit information regarding an identity of the player to a casino system to determine whether the player has casino credit balance; when the casino system indicates that the player has a casino credit balance, causing the mobile attendant device to display information regarding the balance; and crediting at least a portion of the amount of the jackpot to the casino credit balance.

In one embodiment, the player information may be obtained from a player account or may be input into the mobile processing device, such as from a player provided ID.

In one embodiment, the casino system may comprise a casino CMS system or a central credit system.

The information regarding the identity of the player may be transmitted from the jackpot processing server to the casino system via an API The information regarding the credit balance may comprise at least one of an indication of the existence a casino credit balance, information regarding at least one marker, and a monetary amount of said casino credit balance.

Further objects, features, and advantages of the present invention over the prior art will become apparent from the detailed description of the drawings which follows, when considered with the attached FIGURES.

DESCRIPTION OF THE DRAWINGS

FIG. 1 is a diagram of a system in accordance with an embodiment of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention include, but are not limited to, methods and systems for processing jackpots, including integrating jackpot processing with other features such as financial systems which track player markers.

FIG. 1 illustrates one embodiment of the invention, which comprises a system 20. The system 20 may be referred to as a gaming system. As noted below, portions of the system might belong to or be operated by a casino (or the owner thereof) or entities other than a casino, and might be on-site or off-site as to the casino. In one embodiment, the system 20 may comprise elements associated with a casino, while other elements might be associated with third parties, such as a casino vendor or financial processor.

As indicated, a casino C may include one or more devices and/or systems and may be associated with one or more physical locations. In one embodiment, the casino C may include one or more gaming devices 22. Such gaming devices 22 may have various forms and be configured to present a wide variety of games. For example, the gaming devices 22 might comprise "slot" type gaming machines (having mechanical or video-simulated reels), video poker gaming machines, or other types of gaming machines which are now known or later developed. In general, the gaming devices 22 are preferably configured to present one or more games (generally games of chance or games that include a skill component but which are still predominantly games of chance), such as in exchange for the placement of a wager.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits). The awards might comprise, for example, awards of monetary value credits. Awards of a large size may be referred to as a "jackpot" award. In one embodiment, smaller awards might be awarded to the player as monetary value credits which are associated with a monetary value credit balance at the gaming machine. The player may be permitted to cash-out those credits, such as to a monetary-value ticket which the player can redeem at a kiosk or cashier station for cash (e.g. coins or currency) or as monetary value associated with a gaming account, bank account or the like. However, as indicated herein, jackpots might be processed in other manners.

The gaming device 22 might be configured as a stand-alone device (such as where the one or more games are presented by execution of machine-readable code by a processor or controller of the gaming machine) or as a server-based device (e.g. where certain information or instructions is generated remotely, such as by a gaming server, and is transmitted to the gaming device) for presenting games as Class III games (as defined by the U.S. Indian Gaming Regulatory Act) or as a server-based device for presenting games as Class II games (as defined by the U.S. Indian Gaming Regulatory Act).

The gaming devices 22 might comprise other than gaming machines, and might comprise, for example, gaming tables or other gaming devices. For example, the gaming devices 22 might comprise gaming tables at which card games, dice games, roulette or other games are presented. A casino may have numerous such gaming devices 22, such as located on a casino floor or in other locations.

Referring still to FIG. 1, the casino C may include one or more central casino systems, which systems may include one or more servers and/or other devices for implementing casino-related functionality. For example, the casino C might include an accounting server 23, a loyalty server 24 and a central credit server 25. These servers 23, 24, 25 may each comprise a computing device which comprises at least one processor for receiving information, processing information or executing code or software, and generating an output, such as control instructions. The casino servers 23, 24, 25 may also include means for storing information or instructions. Such means may comprise one or more memory devices. Such might comprise RAM, ROM (including EPROM, EEPROM, PROM) or other devices now known or later developed. In one embodiment, the servers may comprise or be in communication with one or more mass data storage devices, such as one or more hard drives or the like.

The casino servers 23, 24, 25 preferably also include at least one communication interface, by which it may receive and transmit information. The communication interface(s) may permit communications in accordance with various protocols (TCP/IP, 802.11xx, etc.) and in various forms and over various types of links (wired and/or wireless).

The casino servers 23, 24, 25 might actually comprise a system or network of a plurality of elements or devices. For example, the servers might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the server, such as to change operator settings and the like. The casino servers might also comprise a router and one or more separate computing devices. The functions of the various computing devices might be segregated (including by executing different modules of software which implement different features/functions).

The one or more gaming devices 22 are preferably in communication with the one or more casino servers 23, 24, 25 at one or more times. For example, the gaming devices 22 and the one or more casino servers 23, 24, 25 may be linked via one or more communication links. These communication links may be wired and/or wireless and may be dedicated, shared, part of a LAN, WAN or other network, such as an internal casino network.

The accounting server 23 may be configured to implement accounting and/or ticketing functionality. In such a configuration, the gaming devices 22 may communicate with the accounting server 23, such as when seeking to print a monetary value ticket upon a cash-out request of a player (such as to create a ticket record and associated amount), or when a player seeks to redeem a monetary value ticket at the gaming machine (such as to validate the ticket and its amount). The accounting server 23 may, for example, generate and maintain records of monetary value tickets, including their amounts, whether they have been cashed-out, etc., and/or may perform other functionality, such as general accounting functionality (tracking and reconciling monetary value provided to the gaming devices 22, amounts wager, amounts won, amounts cash-out, etc.).

The loyalty server 24 may also implement player loyalty functionality. For example, the gaming devices 22 may communicate with the loyalty server 24 to report player activity. The loyalty server 24 may maintain one or more player accounts, such as player loyalty accounts with game play information and loyalty awards.

The central credit server 25 may also implement player credit and/or monetary account functionality, such as a player wagering account for funding wagering and credit functionality, such as issuance of credit to the player. Such credit might comprise, for example, a casino marker. A casino marker comprises a negotiable instrument that represents an amount of credit given to the player (and thus debt by the player to the casino). The central credit server 25 may thus track markers which are outstanding to individual players, including amounts of credit extended to the players and associated terms, such as redemption periods and terms of the credit. While this functionality may be implemented by a casino, it may also be implemented by third party providers, such as a financial provider as described below.

The one or more casino servers may also implement game functionality. For example, the gaming devices 22 may communicate with the casino servers, such as to obtain game information, including game outcome information, to facilitate progressive jackpots or other gaming functionality.

As illustrated in FIG. 1, the system 20 preferably includes a financial system F. Elements of this system may be operated by an entity which is separate from the casino and one or more of the element of the financial system F might be located at the casino or be remote therefrom. In other embodiments, financial system F might be part of the casino C, including being operated by the casino.

In one embodiment, the financial system F comprises one or more financial servers 28 (which may also be referred to as a jackpot processing server or the like), one or more kiosks 30, and one or more mobile transaction devices 32. In general, the financial server 28 may be configured to facilitate various requested financial transactions. The financial system F may include one or more databases which are configured to store information.

The kiosks 30 may have various configurations. In one embodiment, the kiosk 30 comprises a housing, one or more devices for receiving player input and/or displaying or otherwise providing information to a player, and at least one credit dispensing mechanism. The information input/output devices may include, for example, an electronic touch-screen video display. Other input/output devices may include one or more push-buttons, keypads, keyboards and/or other elements. The credit dispensing mechanism may comprise, but it not limited to one or more of: a currency dispenser, a coin dispenser, a ticket or other media dispenser (such as a magnetic card dispenser), or a media writer (such an RFID encoder or the like).

In one embodiment, the kiosk 30 includes at least one processor for executing machine readable code or software, and at least one memory device for storing machine readable code or software for execution by the processor. In one embodiment, the kiosk 30 includes at least one communication interface, such as for establishing a communication link with one or more other devices, such as the financial server 28. The kiosk 30 is preferably located within the casino C, such as where a plurality of kiosks 30 are located about the casino floor for access by players and/or attendants, as described below.

The mobile device 32 may comprise, for example, a tablet, but might also comprise a PDA or phone, or comprise a special-purpose device which is configured to implement the functionality herein. The mobile device 32 preferably comprises a housing, at least one display device (such as a video display), at least one user input device (such as one or more buttons, a touch screen, etc.), a processor, a memory, and a communication interface. Preferably, the communication interface supports or enables wireless communications. The memory may store machine-readable code which, when executed by the processor, causes the mobile device 32 to implement the functionality herein. In some instances, that code may comprise, for example, an "application" which is stored and runs on the mobile device 32. In other embodiments, the mobile device 32 may be configured to implement a web browser which causes the mobile device 32 to implement the functionality herein when the mobile device 32 is in communication with the financial server 28 (or other server/device). As described below, the mobile device 32 may be operated by a casino attendant A and may include various security elements (secure logins, etc.).

The financial server 28 is preferably configured to communicate with one or more aspects of the casino system C, such as one or more of the casino servers 23, 24, 25. In one embodiment, the casino servers 23, 24, 25, may run software which is different from, or is not integrated with, the software of the financial server 28. In such a configuration, the financial server 28 and the one or more casino servers 23, 24, 25 may communicate through one or more interfaces 26. These interfaces may comprise application program interfaces (APIs) which allow the servers to communicate with one another, such as by making "calls" to the other system for information, such as described below. As one example, the financial system F might comprise a server running Jackpot Xpress® from Everi Payments, Inc. of Las Vegas, Nevada. The casino might utilize a casino management system from a third party, such as IGT Advantage® from International Game Technology of Reno, Nevada. In that event, an API may be required for the Jackpot Xpress system to communicate with the IGT Advantage system.

In one embodiment, the financial system F is configured to communicate with one or more external devices or networks. For example, the financial system F may communicate with the Internet, and thus individual players, an external banking network, etc.

In one embodiment, as described below, the financial system F may include an email server 34. The email server 34 might be implemented in various manners. In one embodiment, it is implemented separately from the financial server 28, such as via a different computing device. The email server 34 may, for example, be segregated from the financial server 28 or other aspects of the financial system F or casino system C, including by one or more firewalls.

Additional aspects of the system 20 (including the configuration of machine-readable code or "software" which is executable by the processors of the various devices of the system 20) will be appreciated from examples of use thereof as described below.

One aspect of the invention is the processing of a jackpot win, including determining if the player has an outstanding marker (or other casino payment obligation), in which case, an option may be provided to credit all or part of the jackpot win to payment of the player's outstanding markers.

In one embodiment, a notification of a gaming machine jackpot is reported and/or received. As one example, a player may play a gaming device 22 such as that illustrated in FIG. 1. The player may obtain a winning game outcome. The winning outcome and/or associated award may be reported, such as by the gaming device 22 to one of the casino servers 23, 24, 25. If the winning game outcome has an award over a designated amount, then either the gaming device 22 and/or casino server 23, 24, 25 may detect or flag the outcome or award as requiring secondary validation, reporting or the like.

In one embodiment, the jackpot event is reported from one of the casino servers 23, 24, 25 to the financial server 28. Casino personnel may also be alerted to the jackpot win, such as by one of the casino servers 23, 24, 25 and/or the financial server 28. An attendant A may obtain a mobile processing device 32 and travel to the gaming device 22 that the player is playing. The attendant A may log into the device and then obtain information about the jackpot award. This information may be provided to the mobile processing device 32 from the financial server 28.

The information may include information regarding the player, or the attendant may collect that information from the player. For example, a player might provide an ID, a player loyalty card or account number, and/or name or other identifying information.

The player information may be used to determine whether the player has any outstanding credit obligations to the casino, such as outstanding/unpaid markers. In one embodiment, for example, the mobile processing device 32 may send a request to the casino credit server 24 (directly, through the financial server 28 or the like) to check whether the player who has won the jackpot has outstanding credit. This request preferably includes player identity information.

The request is used to poll the casino credit server 24 for outstanding credit obligations of the player. Such may comprise, for example, one or more markers. As indicated above, the request may pass through an API which allows the requesting system or device (such as the financial server 28 or mobile processing device 32) to communicate with the casino credit server 24.

In such event, information regarding the one or more outstanding credit obligations may be transmitted back to the mobile processing device 32 and might be displayed to the attendant A by an interface thereof. The attendant may be alerted to the number of credit obligations or markers, the amount of outstanding credit which the player is obligated to repay, etc. In another embodiment, a "marker" or "other" field might be displayed on the interface, thus alerting the attendant to the existence of outstanding credit and the option of crediting payment thereto.

So alerted, some or all of the amount of the jackpot which has been won by the player might be credited to the credit obligations, such as to pay them down or pay them off. In one embodiment, the attendant may seek player authorization for such payment. In other embodiments, the repayment from the jackpot may be automatic (e.g. without regard to whether the player desires to use the jackpot funds to pay down or pay off the credit obligations). In some embodiments, the attendant may input an amount (such as $XXX.YY) of the jackpot to be credited. In the case of multiple outstanding markers or other lines of credit, the attendant might be permitted to enter different amounts to be credited to the different markers or lines, or the markers or lines or credited might be credited from largest outstanding amount to smallest, oldest to newest, etc. In this regard, numerous required or optional rules may be implemented. For example, markers generally have payment terms which include a date by which the marker must be repaid. In one embodiment, if the marker is outstanding, but not past its repayment deadline, jackpot funds might optionally be used to pay the marker. On the other hand, if the marker is past its payment deadline and remains unpaid, jackpot funds may automatically be deducted and applied to payment of the marker.

When jackpot funds are credited to an outstanding marker or other line of credit, one or more transaction records may be created and linked to the jackpot. The records might be associated with the jackpot processing server 28 and/or transmitted to one or more of the casino servers 23, 24, 25, such as the casino credit server 25 to indicate the payment towards the marker or other casino credit, and/or to the accounting server 23, such as to reconcile the jackpot win at the machines to payments to the player's marker(s) and/or to the player.

Further, jackpot processing forms may be completed in relation to the transaction. For example, one or more jackpot processing forms may be displayed to the attendant A. These forms may be transmitted to the mobile processing device 32 and/or reside on the device, where those forms are preferably auto-populated with information which is stored by or obtained by the financial server 28 (either directly or as gathered from one or more of the casino servers 23, 24, 25). For example, the forms may include a W2G form which is populated with information regarding the player and the amount of the winnings (the information regarding the amount of the winnings and the player may be obtained, for example, by the financial server 28 from the casino server 23, 24, 25, including based upon the player's casino rewards account). Alternatively, or in addition, the attendant may manually gather information from the player or have the player enter the information into the mobile processing device 32 in order to complete the required forms (these forms may include government required reporting forms, casino release forms or other documents). For example, if the player does not have a player tracking account, the attendant may need to obtain the player's identity information directly.

In one embodiment, once the forms are complete, the attendant captures the player's signature (directly onto the forms or for association with the forms). This may comprise having the player sign via a touchscreen of the mobile processing device 32. The completed form(s) or associated information is then transmitted from the mobile processing device 32 back to the financial server 28. The financial server 28 may store the completed forms, such as in association with one or more transaction records, may transmit the forms to the casino, and/or may transmit the forms to the appropriate authorities (such as the IRS). Also, once the forms have been completed, if the jackpot is a 'hand pay' jackpot, the attendant may be notified that the jackpot can be paid or issued.

If not already done, the financial server 28 preferably collects personal information regarding the player. This information may be obtained from one or more of the casino servers 23, 24, 25, such as from a player tracking account for the player. Alternatively, the information might be obtained from the player, such as based upon information that the player provided to the attendant and which was input to the mobile processing device 32. This information may comprise one or more of the player's name, address, phone number, email address, social security number and the like.

In one embodiment of the invention, one or more jackpot-related forms are made available to the player. Most preferably, the one or more forms are made available to the player in a secure manners. For example, the documents might be made available for download D, by emailing EM, etc., including as described in U.S. Pat. No. 11,030,853 and U.S. patent application Ser. No. 17/339,471, filed Jun. 4, 2021, both of which are incorporated herein by reference in their entirety.

If the player has remaining jackpot funds after application of the jackpot funds to repay such casino credit obligations, the player may be paid the remaining winnings. Such winnings may be paid from a pouch P of the attendant, such as in currency form. In other embodiments, the attendant might access funds from the kiosk in order to pay the player. Of course, the player might be paid in other manners, such as with a receipt, ticket or the like which the player may redeem at a cashier cage. In other configurations, remaining funds may be directed to a player's casino account or wallet (such as Everi Payment Inc.'s CashClub Wallet™ product), or even the player's bank account.

While in one embodiment of the invention an attendant uses a mobile processing device 32 in order to process the jackpot, the principles of the invention (including checking whether the player who has won the jackpot has an outstanding casino credit obligation) may be applied in other manners. For example, in one embodiment, an attendant A might input player information into a kiosk, workstation or the like in order to check whether the player has an outstanding credit obligation. In another embodiment, the financial server 28 may receive information regarding a jackpot win, including player information. The financial server 28 might then communicate with the one or more casino servers 23, 24, 25 to determine whether the player has an outstanding credit obligation. If so, the financial server 28 may so notify the attendant A and the attendant A may confirm that the player at the gaming device 22 matches the player identified by the system, and thus that the casino credit obligation validly belongs to the player.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for processing casino winnings won by a player on a gaming device, the system comprising:

a mobile attendant device, said mobile attendant device comprising a processor configured to execute machine readable code, a memory, a display device, at least one user input device and machine-readable code stored in the memory;

a jackpot processing server comprising a processor configured to execute machine readable code, a memory, a communication interface, and machine readable code stored in the memory and executable by the processor, wherein the machine readable code of the jackpot processing server configured to cause the processor thereof to:

transmitting information regarding an identity of said player to a casino system to determine whether said player has a casino credit balance;

when said casino system indicates that said player has said casino credit balance, causing the mobile attendant device to display information regarding said casino credit balance and application of an amount of said casino winnings to pay said casino credit balance;

when said casino winnings comprise a monetary value award, causing said monetary value award to remain on the gaming device as a monetary value credit, wherein said monetary value award is less than a jackpot award;

when said casino winnings comprise said jackpot award:

automatically populating a jackpot processing form using said information regarding said identity of said player and said amount of said casino winnings;

alerting, on the mobile attendant device, a casino attendant to said jackpot award;

receiving, from the mobile attendant device, a designation of at least a portion of said amount of said jackpot award for payment of said casino credit balance; and crediting the at least the portion of said amount of said jackpot award to at least one balance of said casino credit balance according to one or more rules.

2. The system in accordance with claim 1, wherein the system further comprises a player account and said information regarding said identity of said player is collected from the player account.

3. The system in accordance with claim 1, wherein said casino system comprises a casino CMS system.

4. The system in accordance with claim 1, wherein said casino system comprise a casino credit system.

5. The system in accordance with claim 1, wherein said information is transmitted from said jackpot processing server to said casino system via an API.

6. The system in accordance with claim 1, wherein said information regarding said casino credit balance comprises at least one of: an indication of an existence said casino credit balance, information regarding at least one marker, and a monetary amount of said casino credit balance.

7. The system in accordance with claim 1, wherein the one or more rules comprise paying an oldest balance of said casino credit balance before one or more younger balances.

8. The system in accordance with claim 1, wherein the one or more rules comprise paying a past due balance of said casino credit balance before one or more non-past due balances.

9. The system in accordance with claim 1, wherein the one or more rules comprise paying a larger balance of said casino credit balance before one or more smaller balances.

10. The system in accordance with claim 1, wherein the designation of the at least the portion of said amount of said jackpot award is entered into the mobile attendant device by the player.

11. A method for processing casino winnings won by a player on a gaming device, the method comprising:

transmitting information regarding an identity of said player to a casino system to determine whether said player has a casino credit balance;

when said casino system indicates that said player has said casino credit balance, causing a mobile attendant device to display information regarding said casino credit balance and application of an amount of said casino winnings to pay said casino credit balance;

when said casino winnings comprise a monetary value award, causing said monetary value award to remain on the gaming device as a monetary value credit, wherein said monetary value award is less than a jackpot award; and when said casino winnings comprise said jackpot award:

automatically populating a jackpot processing form using said information regarding the identity of said player and said amount of said casino winnings;

alerting, on the mobile attendant device, a casino attendant to said jackpot award;

receiving, from the mobile attendant device, a designation of at least a portion of said amount of said jackpot award for payment of said casino credit balance; and crediting the at least the portion of said amount of said jackpot award to at least one balance of said casino credit balance according to one or more rules.

12. The method in accordance with claim 11, wherein the system further comprises a player account and the information regarding said identity of said player is collected from the player account.

13. The method in accordance with claim 11, wherein said casino system comprises a casino CMS system.

14. The method in accordance with claim 11, wherein said casino system comprise a casino credit system.

15. The method in accordance with claim 11, wherein said information is transmitted from a jackpot processing server to said casino system via an API.

16. The method in accordance with claim 11, wherein said information regarding said casino credit balance comprises at least one of: an indication of an existence said casino credit balance, information regarding at least one marker, and a monetary amount of said casino credit balance.

17. The method in accordance with claim 11, wherein the one or more rules comprise paying an oldest balance of said casino credit balance before one or more younger balances.

18. The method in accordance with claim 11, wherein the one or more rules comprise paying a past due balance of said casino credit balance before one or more non-past due balances.

19. The method in accordance with claim 11, wherein the one or more rules comprise paying a larger balance of said casino credit balance before one or more smaller balances.

20. The method in accordance with claim 11, wherein the designation of the at least the portion of said amount of said jackpot award is entered into the mobile attendant device by the player.

* * * * *